(No Model.)
G. A. BARNES.
LATHE CHUCK.
No. 331,603. Patented Dec. 1, 1885.
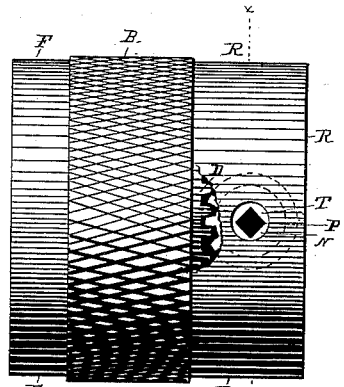
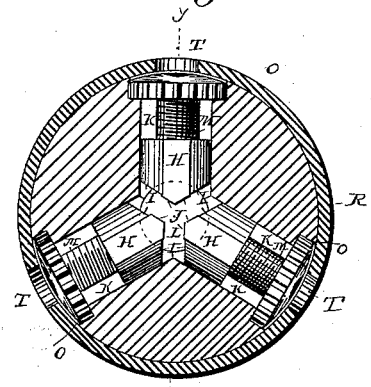
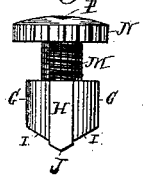
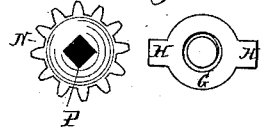
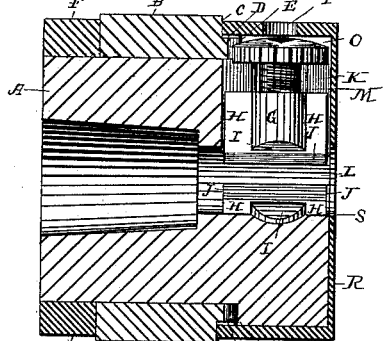
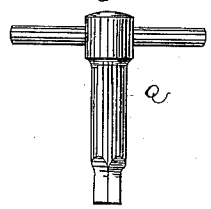
WITNESSES:
M. S. Seeley
E. H. Rogers
INVENTOR
George A. Barnes,
BY Geo. D. Seymour
ATTORNEY

UNITED STATES PATENT OFFICE.

GEORGE A. BARNES, OF NEW HAVEN, CONNECTICUT.

LATHE-CHUCK.

SPECIFICATION forming part of Letters Patent No. 331,603, dated December 1, 1885.

Application filed September 7, 1885. Serial No. 176,305. (No model.)

*To all whom it may concern:*

Be it known that I, GEORGE A. BARNES, residing at New Haven, in the county of New Haven and State of Connecticut, have invented certain new and useful Improvements in Chucks; and I do declare the following to be a full, clear, and exact description of the same, reference being had to the accompanying drawings, which form a part of this specification.

My invention relates to an improvement in that class of chucks having their jaws each connected with a screw and pinion and simultaneously operated by a rack; and it consists in certain details of construction and combinations of parts, as will be hereinafter described, and pointed out in the claims.

In the accompanying drawings, Figure 1 is a view in elevation of a chuck embodying my invention, with a portion of its cap broken away. Fig. 2 is a sectional view of the chuck on the line $x\ x$ of Fig. 1, with the jaws, screws, and pinions in elevation. Fig. 3 is a similar view on the line $y\ y$ of Fig. 2. Fig. 4 is a detached view, in end elevation, of one of the jaws, together with its screw and pinion. Fig. 5 embraces detached plan views of a jaw and a pinion, and Fig. 6 is a view in elevation of the key.

A is the solid frame of the chuck, and B is a broad knurled ring encircling its outer periphery, and adapted to be grasped by the hand and rotated thereupon. C is a rabbet formed in the forward end of the said ring, and D are teeth located upon the same edge of the ring and forming an annular rack. E is a shoulder formed upon the forward end of the frame and constituting a working-face for the teeth of the rack. F is a collar encircling the rear end of the frame, and assisting in holding the ring, which is interposed between it and the shoulder aforesaid, in place. G are the circular central body portions, and H H the guides of the jaws, the latter extending an equal distance each from opposite faces of the former, which thus become longitudinally central to the jaws. I and J J, respectively, are the beveled working-edges of the body portions and guides of the jaws, the body portions being beveled or cut away below the guides, as shown, for clearance. K K K are radial sockets formed in the frame and shaped to receive the jaws and leading into the central opening, L, of the frame. M are screws for operating the jaws, the body portions of which are bored out and tapped to receive them. N are pinions carried by the screws aforesaid, having convex outer faces, and meshing with the rack of the ring B. O are chambers formed in the periphery of the shoulder E, and extending into the frame A to receive the said pinions. P are square holes formed in the pinions to receive the key Q for operating the screws and jaws directly instead of through the rack. R is a cap fitting over the forward end of the frame and holding the pinions, screws, and jaws in place, and extending into the rabbet C of the ring B and over the rack thereof, which is thus incased and protected. S is an opening formed in the cap for access to the central opening of the frame. T T T are openings formed in the cap for the introduction of the key Q into the square holes of the pinions.

The broad knurled ring, constructed and arranged as described, enables a sufficient grip for ordinary purposes to be obtained with the jaws by the hand alone and with great facility and rapidity. A stronger or more powerful grip may be had, when required, by operating the jaws directly by means of the key.

The construction of the jaws so as to locate the screws longitudinally central to their working-edges secures an even distribution of the strain upon the jaws and screws, with obvious gain of strength to the chuck and improving the wearing quality thereof.

The cap affords a simple and effective means for retaining the pinions, and hence the screws and jaws, in place. It also protects the rack and excludes chips and foreign matter from the working parts of the chuck.

Having fully described my invention, what I claim as new, and desire to secure by Letters Patent, is—

1. In a chuck, the combination, with a solid frame provided at its forward end with a shoulder, jaws mounted in the said frame, screws and pinions for operating the jaws, and a ring provided with a rack abutting against the shoulder of the frame and meshing with the said pinions, substantially as set forth.

2. In a chuck, the combination, with a frame, of jaws mounted therein, screws and pinions for operating the jaws, a ring encircling the frame and provided at its forward end with a rack, which meshes with the said pinions and having such end rabbeted, and a cap fitting over the forward end of the frame and over the pinions and rack, and extending into the rabbet of the ring, substantially as set forth.

3. In a chuck, the combination, with a frame provided at its forward end with a shoulder, jaws located in the frame, screws and pinions for operating them, a ring encircling the frame and provided at its forward end with a rack, meshing with the said pinions and abutting against the shoulder of the frame, and having such edge rabbeted, a cap fitting over the forward end of the frame and over the pinions and rack, and extending into the rabbet of the ring, and a collar encircling the frame and holding the ring in place thereon, substantially as set forth.

4. In a chuck, the combination, with a frame, of jaws mounted therein, and each consisting of a circular body portion and two guides projecting an equal distance each from opposite faces of such body portion, screws entering the body portions of the jaws, and pinions carried by the screws for operating them, substantially as set forth.

5. In a chuck, the combination, with a frame, of jaws located therein, screws and pinions for operating them, a rack encircling the frame and meshing with the pinions, and a cap fitting over the forward end of the frame and over the pinions and the rack, substantially as set forth.

In testimony whereof I have signed this specification in the presence of two subscribing witnesses.

GEORGE A. BARNES.

Witnesses:
M. S. SEELEY,
E. H. ROGERS.